United States Patent
Uchino et al.

(10) Patent No.: US 9,014,145 B2
(45) Date of Patent: Apr. 21, 2015

(54) RADIO BASE STATION AND MOBILE STATION

(71) Applicant: NTT DOCOMO, INC., Tokyo (JP)

(72) Inventors: Tooru Uchino, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/373,642

(22) PCT Filed: Mar. 13, 2013

(86) PCT No.: PCT/JP2013/056985
§ 371 (c)(1),
(2) Date: Jul. 22, 2014

(87) PCT Pub. No.: WO2013/137307
PCT Pub. Date: Sep. 19, 2013

(65) Prior Publication Data
US 2015/0009959 A1    Jan. 8, 2015

(30) Foreign Application Priority Data

Mar. 13, 2012   (JP) ................................ 2012-055768

(51) Int. Cl.
| | | |
|---|---|---|
| *H04W 36/00* | (2009.01) | |
| *H04W 36/04* | (2009.01) | |
| *H04W 80/02* | (2009.01) | |
| *H04L 12/801* | (2013.01) | |

(52) U.S. Cl.
CPC .......... *H04W 36/0055* (2013.01); *H04W 36/04* (2013.01); *H04W 80/02* (2013.01); *H04L 47/34* (2013.01)

(58) Field of Classification Search
CPC .... H04W 80/02; H04W 80/00; H04L 1/1867; H04L 47/34
USPC ................................................... 370/241, 331
See application file for complete search history.

(56) References Cited

U.S. PATENT DOCUMENTS

| | | | |
|---|---|---|---|
| 8,743,896 B2 * | 6/2014 | Wu ............................... | 370/431 |
| 2010/0232356 A1 * | 9/2010 | Maheshwari et al. ........ | 370/328 |

(Continued)

FOREIGN PATENT DOCUMENTS

JP        2011-124951 A      6/2011

OTHER PUBLICATIONS

English translation of the Written Opinion for corresponding International Application No. PCT/JP2013/056985, mailed May 21, 2013 (4 pages).

(Continued)

*Primary Examiner* — Raj Jain
(74) *Attorney, Agent, or Firm* — Osha Liang LLP (57) ABSTRACT

Provided is a radio base station and a mobile station capable of reducing a handover delay while avoiding an increase of a load on the C-Plane even in a case where the kind of the PDCP-SN used within a cell after the handover is changed. A radio base station eNB according to the present invention includes a transmission unit configured to notify a mobile station UE that the length of the PDCP-SN used in communication within the first cell (or the second cell) is changed in a case where the mobile station UE performs a handover from the second cell to the first cell (or in a case where the mobile station UE performs a handover from the first cell to the second cell).

4 Claims, 7 Drawing Sheets

(56) References Cited

U.S. PATENT DOCUMENTS

2012/0224560 A1* 9/2012 Fukumoto et al. ............ 370/330
2012/0295609 A1* 11/2012 Li et al. ......................... 455/423
2015/0009959 A1* 1/2015 Uchino et al. ................ 370/331

OTHER PUBLICATIONS

English translation of the International Preliminary Report on Patentability issued in PCT/JP2013/056985 dated Sep. 16, 2014 (1 page).
International Search Report for corresponding International Application No. PCT/JP2013/056985, mailed May 21, 2013 (1 page).
Written Opinion for corresponding International Application No. PCT/JP2013/056985, mailed May 21, 2013 (3 pages).
Alcatel-Lucent; "Reconfiguration of discardTimer in PDCP-Config;" TSG-RAN WG2#74, R2-113230; Barcelona, Spain; May 9-13, 2011 (4 pages).
3GPP TS 36.323 V10.1.0; "3rd Generation Partnership Project; Technical Specification Group Radio Access Network; Evolved Universal Terrestrial Radio Access (E-UTRA): Packet Data Convergence Protocol (PDCP) specification (Release 10);" Mar. 2011 (26 pages).
Office Action for corresponding Japanese Application No. 2012-055768, mailed May 21, 2013 (5 pages).
Office Action in counterpart Korean Patent Application No. 10-2014-7018300, mailed Aug. 20, 2014 (5 pages).
3GPP TS 36.331 V10.4.0; "3rd Generation Partnership Project; Technical Specification Group Radio Access Network; Evolved Universal Terrestrial Radio Access (E-UTRA); Radio Resource Control (RRC); Protoccol specification (Release 10)"; Dec. 2011 (291 pages).

* cited by examiner

PDCP-Config information element

```
-- ASN1START

PDCP-Config ::=                     SEQUENCE {
    discardTimer                        ENUMERATED {
                                            ms50, ms100, ms150, ms300, ms500,
                                            ms750, ms1500, infinity
    }                                                           OPTIONAL,       --
Cond Setup
    rlc-AM                              SEQUENCE {
        statusReportRequired                BOOLEAN
    }                                                           OPTIONAL,       --
Cond Rlc-AM
    rlc-UM                              SEQUENCE {
        pdcp-SN-Size                        ENUMERATED {len7bits, len12bits}
    }                                                           OPTIONAL,       --
Cond Rlc-UM
    headerCompression                   CHOICE {
        notUsed                             NULL,
        rohc                                SEQUENCE {
            maxCID                              INTEGER (1..16383)              DEFAULT
15,
            profiles                            SEQUENCE {
                profile0x0001                       BOOLEAN,
                profile0x0002                       BOOLEAN,
                profile0x0003                       BOOLEAN,
                profile0x0004                       BOOLEAN,
                profile0x0006                       BOOLEAN,
                profile0x0101                       BOOLEAN,
                profile0x0102                       BOOLEAN,
                profile0x0103                       BOOLEAN,
                profile0x0104                       BOOLEAN
            },
            ...
        }
    },
    ...,
    [[  rn-IntegrityProtection-r10     ENUMERATED {enabled}    OPTIONAL    -- Cond RN
    ]]
}

-- ASN1STOP
```

| PDCP-Config field descriptions |
|---|
| *statusReportRequired* |
| Indicates whether or not the UE shall send a PDCP Status Report upon re-establishment of the PDCP entity as specified in TS 36.323 [8]. |

| Conditional presence | Explanation |
|---|---|
| Rlc-AM | The field is mandatory present upon setup of a PDCP entity for a radio bearer configured with RLC UM. The field is optional, need ON, in case of reconfiguration of a PDCP entity at handover for a radio bearer configured with RLC UM. Otherwise the field is not present. |

RADIO BASE STATION AND MOBILE STATION

BACKGROUND OF THE INVENTION

1. Technical Field

The present invention relates to a radio base station and a mobile station.

2. Background Art

Figure 5:
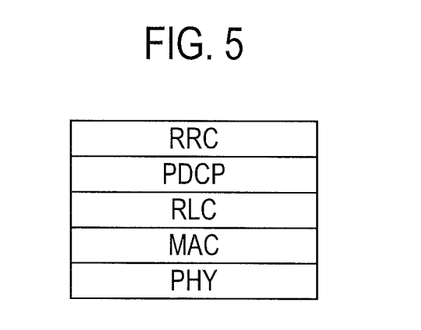
FIG. 5 is a diagram for explaining a conventional mobile communication system.

In the LTE (Long Term Evolution)—Advanced scheme, a physical (PHY) layer, a MAC (Media Access Control) layer, an RLC (Radio Link Control) layer, a PDCP (Packet Data Convergence Protocol) layer, and an RRC (Radio Resource Control) layer are provided in a mobile station UE and a radio base station eNB as illustrated in FIG. 5.

The PDCP layer on a transmission side is configured to perform an encryption process and a process for falsification detection on a PDCP-SDU (Service Data Unit) received from the RRC layer using a COUNT value, and transmit a PDCP-PDU (Protocol Data Unit) provided with a PDCP-SN (Sequence Number) as a header to the RLC layer.

Figure 6:
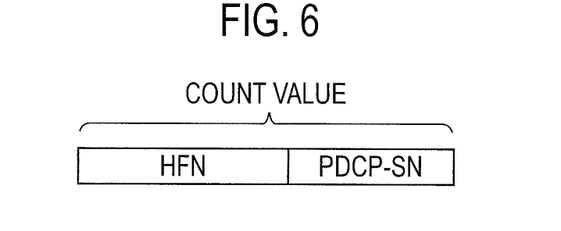
FIG. 6 is a diagram for explaining the conventional mobile communication system.

Here, the COUNT value includes an HFN (Hyper Frame Number) and the PDCP-SN as illustrated in FIG. 6.

Incidentally, the PDCP-SN has 12 bits and is configured to be incremented each time the PDCP-PDU is generated and transmitted to the RLC layer. The HFN has 20 bits and is configured to be incremented each time the PDCP-SN circulates.

On the other hand, the PDCP layer on a reception side is configured to perform an encryption process and a falsification detection process using a COUNT value.

Figure 7:
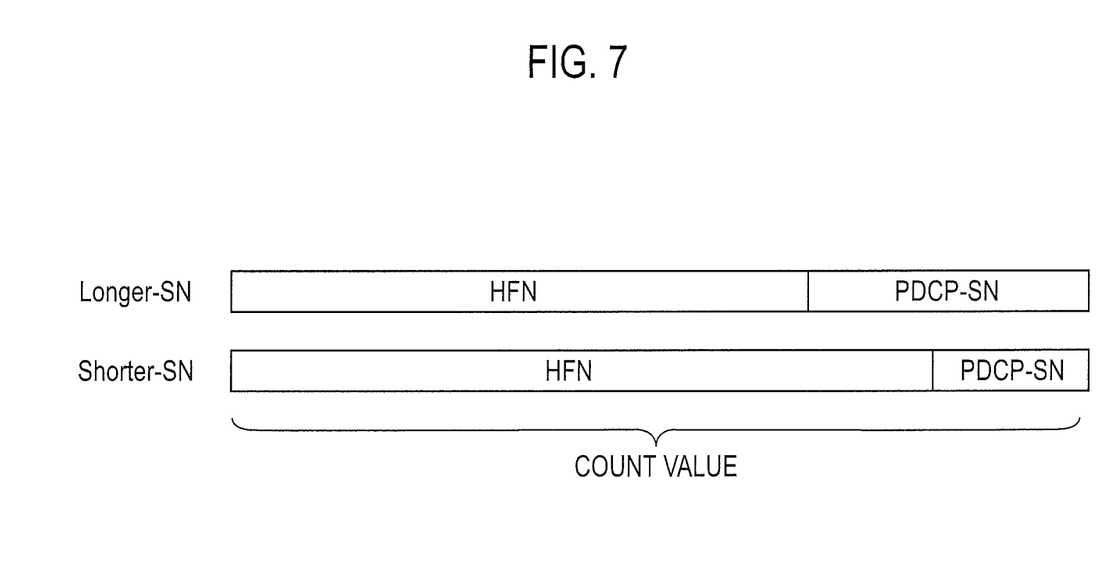
FIG. 7 is a diagram for explaining the conventional mobile communication system.

Furthermore, the PDCP layer on the transmission side can select one out of two kinds, i.e., "Longer-SN" having a 12-bit length and "Shorter-SN" having a 7-bit length as illustrated in FIG. 7 and set up the selected one as the PDCP-SN for a bearer (for example, voice bearer) of RLC-UM (Un-Acknowledged Mode).

Here, the "Longer-SN" has an advantage that tolerance to a packet loss is strong, but has a disadvantage that the overhead becomes large.

On the other hand, the "Shorter-SN" has an advantage that the overhead is small, but has a disadvantage that tolerance to a packet loss is weak.

In general, therefore, it is considered to be preferable to use the "Shorter-SN" for a bearer that requires a high quality such as the voice bearer, from a viewpoint of coverage (viewpoint of overhead).

CITATION LIST

Non-Patent Literature
Non-Patent literature 1: 3GPP TS36.323

SUMMARY OF INVENTION

However, the present inventors found that the current LTE-Advanced scheme has problems described hereafter.

Figure 8:
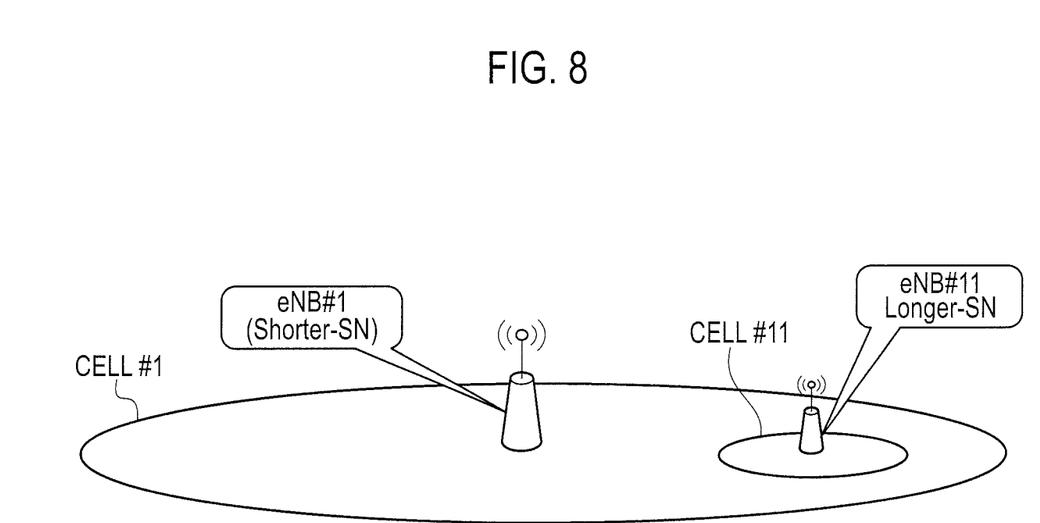
FIG. 8 is a diagram for explaining the conventional mobile communication system.

Within a cell #11 having a small cell radius (for example, a femtocell) as illustrated in FIG. 8, influence from viewpoints of resource and coverage caused by setting up the "Longer-SN" is slight. Therefore, it is considered that "Longer-SN" can be used even for a bearer that requires a high quality such as a voice bearer.

Incidentally, within a cell #1 having a comparatively large cell radius as illustrated in FIG. 8 (for example, a macrocell), the "Shorter-SN" is used in some cases.

In a case where a mobile station UE performs a handover between a cell in which the "Shorter-SN" is used and a cell in which the "Longer-SN" is used, it is impossible in the current LTE-Advanced scheme to change the length of PDCP-SN used by the mobile station UE in communication within a cell after the handover.

Figure 9:
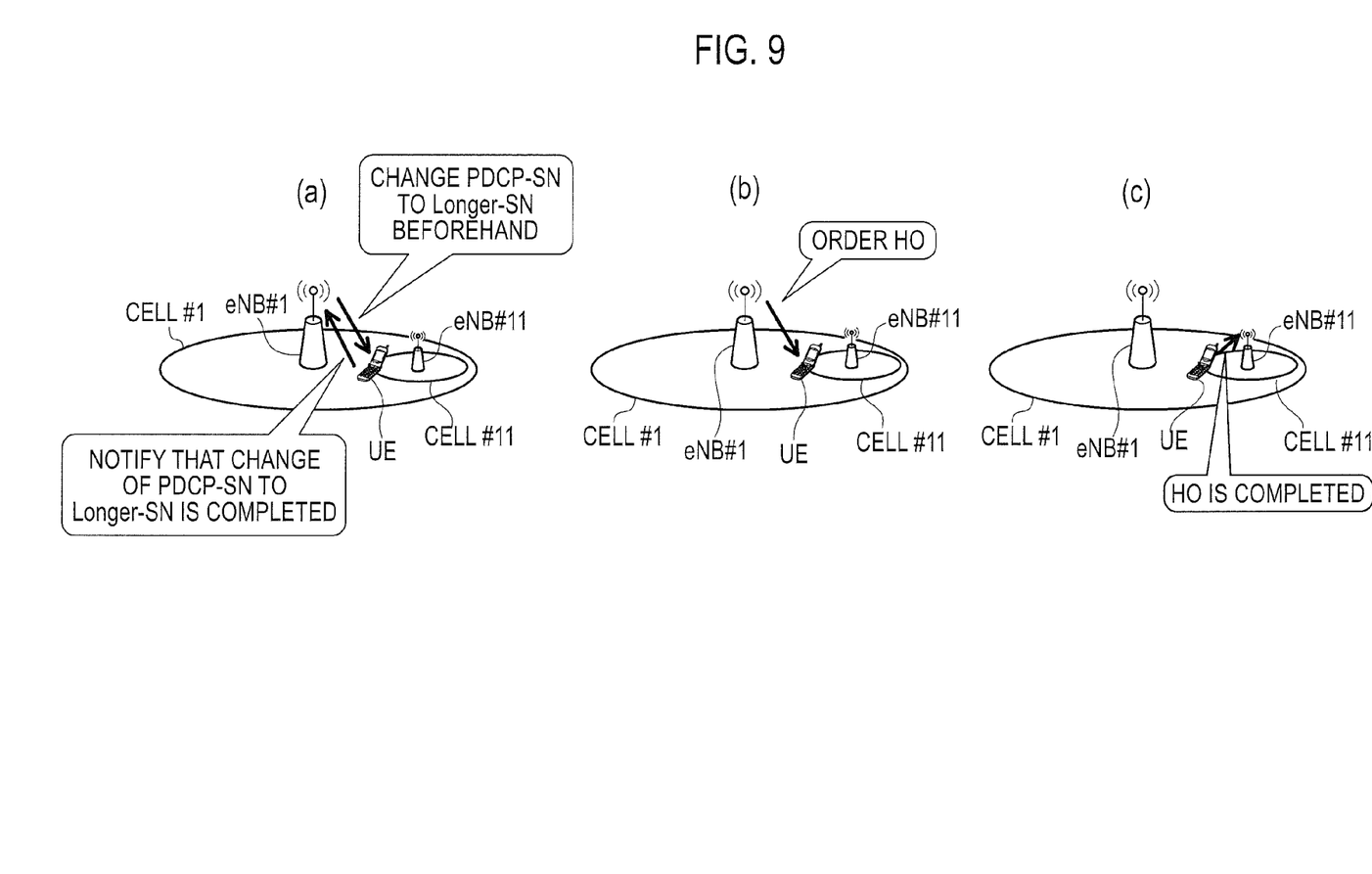
FIGS. 9(a) to 9(c) are diagrams for explaining the conventional mobile communication system.

For changing the length of the PDCP-SN used by the mobile station UE in communication within a cell after the handover, in the current LTE-Advanced scheme, therefore, in a case where the mobile station UE determines to perform the handover from the cell #1 in which the "Shorter-SN" is used to the cell #11 in which the "Longer-SN" is used, it has been necessary for a radio base station eNB#1, which manages the cell #1, to order the mobile station UE to change the PDCP-SN used in communication within the cell #11 from the "Shorter-SN" to the "Longer-SN" as illustrated in FIG. 9(a) and then perform the handover procedure as illustrated in FIG. 9(b) and FIG. 9(c).

Alternatively, in a case where the mobile station UE determines to perform a handover from the cell #1 in which the "Shorter-SN" is used to the cell #11 in which the "Longer-SN" is used, it has been necessary, after a handover procedure from the radio base station eNB #1, which manages the cell #1, to the cell #11 was completed, to change the PDCP-SN used for the mobile station UE in communication within the cell #11 from the "Shorter-SN" to the "Longer-SN."

In such a case, there has been a problem that a load on a C-Plane increases and a handover delay is incurred.

The present invention is achieved in view of the above problem, and an object thereof is to provide a radio base station and a mobile station capable of reducing the handover delay while avoiding an increase of the load on the C-Plane even in a case where the kind of the PDCP-SN used within the cell after the handover is changed.

A first feature of the present invention is a radio base station that manages a first cell or a second cell in a mobile communication system in which the first cell using a first sequence number as a sequence number in a PDCP layer and the second cell using a second sequence number that has the length longer than the length of the first sequence number as a sequence number in the PDCP layer are provided, the radio base station including a transmission unit configured to notify a mobile station that the length of the sequence number in the PDCP layer is changed in a case where the mobile station preforms a handover from the first cell to the second cell or from the second cell to the first cell.

A second feature of the present invention is a mobile station capable of conducting communication in a mobile communication system in which a first cell using a first sequence number as a sequence number in a PDCP layer and a second cell using a second sequence number that has the length longer than the length of the first sequence number as a sequence number in the PDCP layer are provided, the mobile station including a setup unit configured to change the length of the sequence number in the PDCP layer used in communication within the first cell or the second cell in response to an order from a radio base station that manages the first cell or the second cell, in a case where the mobile station performs a handover from the first cell to the second cell or from the second cell to the first cell.

DESCRIPTION OF EMBODIMENT

Mobile Communication System According to First Embodiment of the Present Invention A mobile communication system according to a first embodiment of the present invention will now be described with reference to FIGS. 1 to 4.

A mobile communication system according to the present embodiment will be described by taking a mobile communication system of an LTE-Advanced scheme as an example. However, the present invention is not limited to such a mobile communication system, and can be applied to mobile communication systems of other schemes as well.

As illustrated in FIGS. 1(a) and 1(b), a cell #1 (macrocell) in which the "Shorter-SN" is used as PDCP-SN and a cell #11 (femtocell) in which "Longer-SN" is used as the PDCP-SN are provided in the mobile communication system according to the present embodiment.

Here, the cell #1 is managed by a radio base station eNB #1, and the cell #11 is managed by a radio base station eNB #11.

Figure 2:
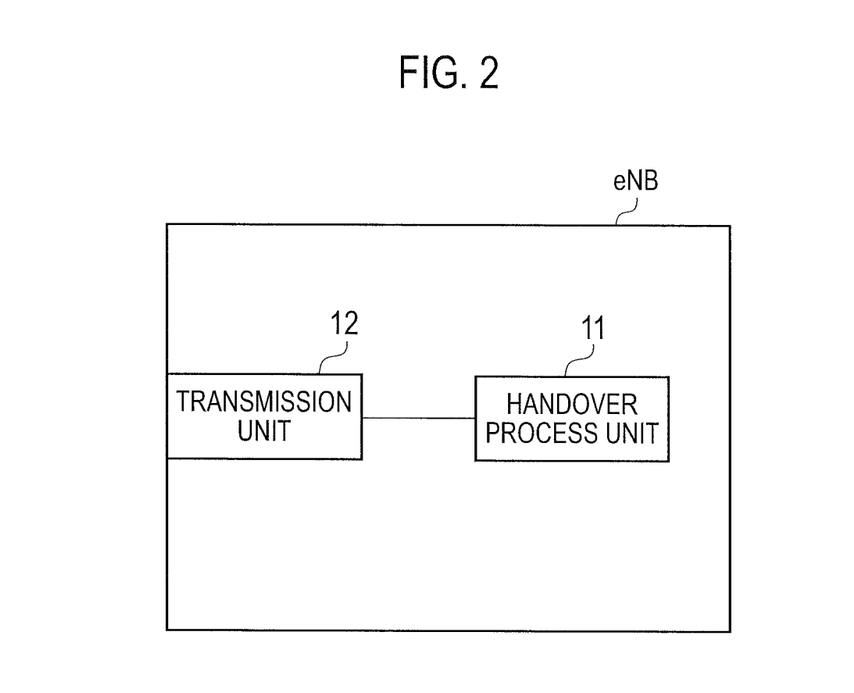
FIG. 2 is a functional block diagram of a radio base station according to the first embodiment of the present invention.

As illustrated in FIG. 2, the radio base station eNB #1/eNB #11 according to the present embodiment includes a handover process unit 11 and a transmission unit 12.

The handover process unit 11 in the radio base station eNB #1/eNB #11 is configured to perform a handover process concerning a mobile station UE that is conducting communication within the cell #1/#11.

For example, the handover process unit 11 in the radio base station eNB #1/eNB #11 may be configured to perform a handover process (inter-eNB handover process) of the mobile station UE from the cell #1 to the cell #11.

Incidentally, the handover process unit 11 in the radio base station eNB #1/eNB #11 may be configured to perform an Intra-eNB handover process concerning the mobile station UE.

The transmission unit 12 in the radio base station eNB #1/eNB #11 is configured to transmit a signal concerning the handover process performed for the mobile station UE by the handover process unit 11.

For example, the transmission unit 12 in the radio base station eNB #1 is configured to notify the mobile station UE that the length of the PDCP-SN used in communication within the cell #11 is changed as illustrated in FIG. 1(a), in a handover process performed by the handover process unit 11 in the radio base station eNB #1 in a case where the mobile station UE performs a handover from the cell #1 to the cell #11.

Alternatively, the transmission unit 12 in the radio base station eNB #11 is configured to notify the mobile station UE that the length of the PDCP-SN used in communication within the cell #11 is changed as illustrated in FIG. 1(a), in a handover process performed by the handover process unit 11 in the radio base station eNB #11 in a case where the mobile station UE performs a handover from the cell #1 to the cell #11.

Figure 3:
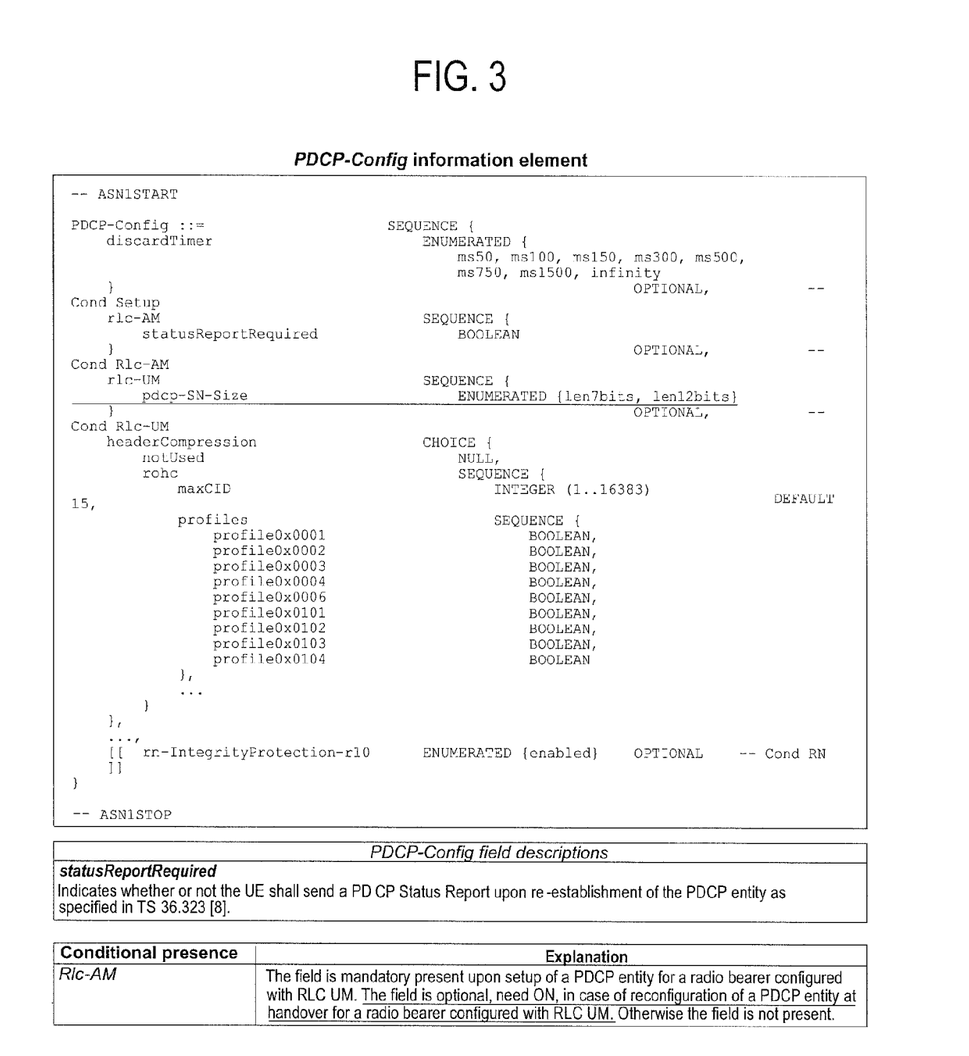
FIG. 3 illustrates an example of a format of an information element "PDCP-Config" transmitted by a radio base station according to the first embodiment of the present invention.

Here, for example, the transmission unit 12 in the radio base station eNB #1/eNB #11 may be configured to notify the mobile station UE of the length of the PDCP-SN used in communication within the cell #11 (12 bits in an example illustrated in FIGS. 1(a) and 1(b)) using "pdcp-size" in an information element "PDCP-Config" as illustrated in FIG. 3.

Incidentally, the transmission unit 12 in the radio base station eNB #1/eNB #11 may be configured not to notify the mobile station UE of the length of the PDCP-SN used in communication within the cell #11 using the "pdcp-size" or the like in the information element "PDCP-Config" in a case where the length of the PDCP-SN used by the mobile station UE in communication within the cell #11 is not changed.

Furthermore, in such a case, the transmission unit 12 in the radio base station eNB #1/eNB #11 may be configured to notify the mobile station UE of information for designating the "Longer-SN" or the "Shorter-SN" as the length of the PDCP-SN used in communication within the cell #11.

Furthermore, the transmission unit 12 in the radio base station eNB #1/eNB #11 may be configured to notify the mobile station UE of the length of the PDCP-SN used by the mobile station UE in communication within a cell of a handover destination, in a case where the length of the PDCP-SN used by the mobile station UE in communication within the cell of the handover destination is changed even in a case where the mobile station performs a handover (intra-eNB handover) between cells under the control of a radio base station eNB.

Furthermore, in the same way, the transmission unit 12 in the radio base station eNB #11 may be configured to notify the mobile station UE that the length of the PDCP-SN used in communication within the cell #1 is changed, in a handover process performed by the handover process unit 11 in the radio base station eNB #11 in a case where the mobile station UE performs a handover from the cell #11 to the cell #1.

Alternatively, the transmission unit 12 in the radio base station eNB #1 may be configured to notify the mobile station UE that the length of the PDCP-SN used in communication within the cell #1 is changed, in a handover process performed by the handover process unit 11 in the radio base station eNB #1 in a case where the mobile station UE performs a handover from the cell #11 to the cell #1.

Figure 4:
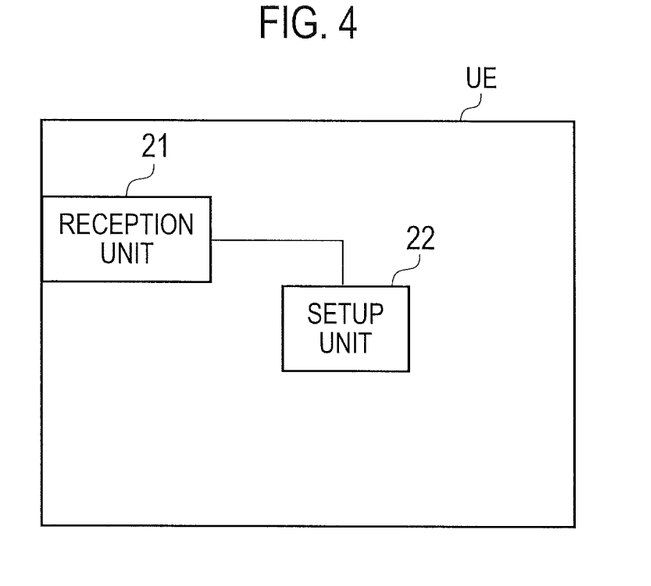
FIG. 4 is a functional block diagram of a mobile station according to the first embodiment of the present invention.

As illustrated in FIG. 4, the mobile station UE according to the present embodiment includes a reception unit 21 and a setup unit 22.

The reception unit 21 is configured to receive a signal from the radio base station eNB #1/eNB #11 in a case of performing a handover from the cell #1 to the cell #11 and from the cell #11 to the cell #1.

For example, the reception unit 21 may be configured to receive an order signal that orders to change the length of the PDCP-SN used in communication within the cell #11/#1 (for example, the information element "PDCP-Config" illustrated in FIG. 3) from the radio base station eNB #1/eNB #11 as illustrated in FIG. 1(a), in a case of performing a handover from the cell #1 to the cell #11 and from the cell #11 to the cell #1.

Figure 1:
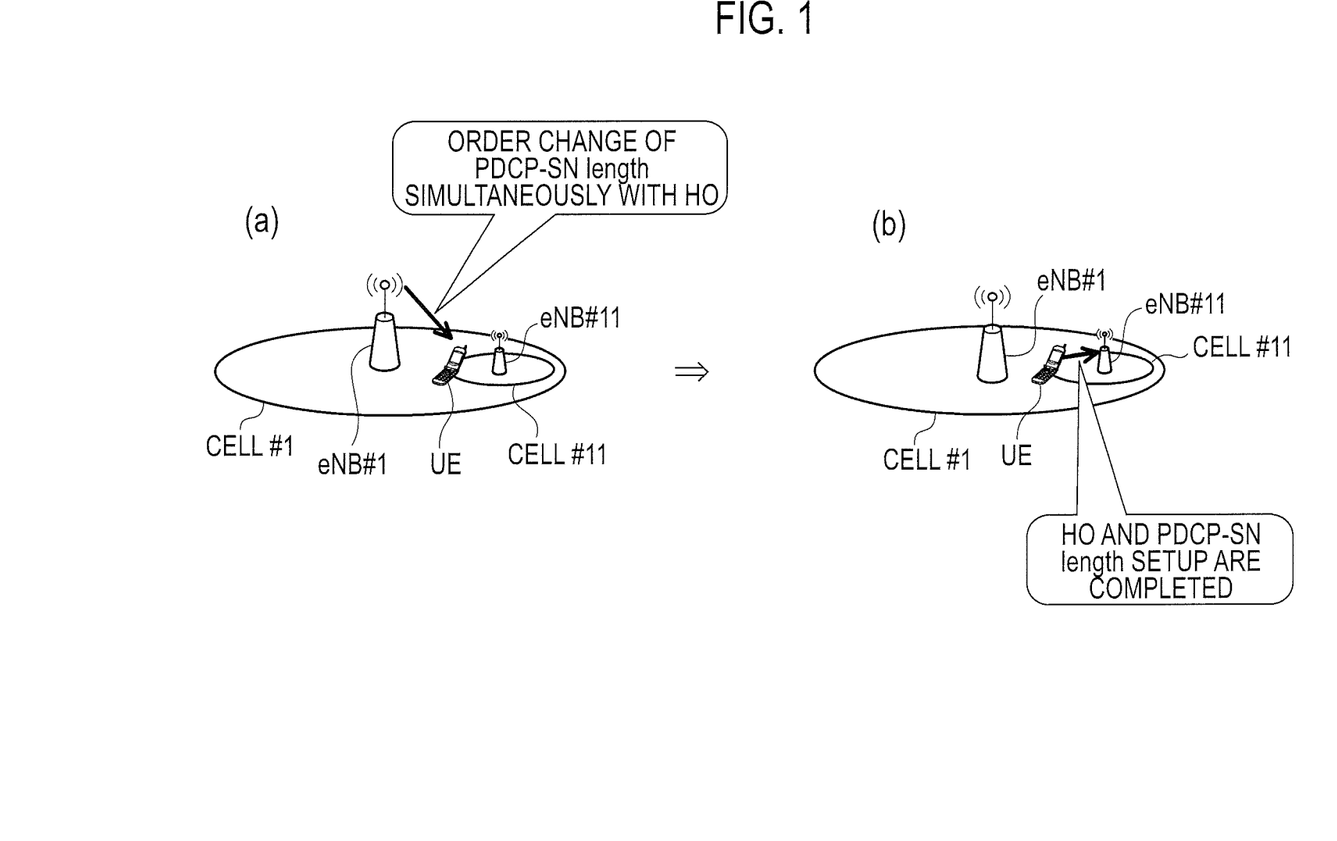
FIGS. 1(a) and 1(b) are general configuration diagrams of a mobile communication system according to a first embodiment of the present invention.

The setup unit 22 is configured to change the length of the PDCP-SN used in communication within the cell #11/#1 in response to the order signal from the radio base station eNB #1/eNB #11 received by the reception unit 21 as illustrated in FIG. 1 (b).

Owing to the mobile station UE and the radio base station eNB #1/#11 according to the present embodiment, it is possible to notify the mobile station UE that the length of the PDCP-SN used in communication within the cell #11/#1 is changed, in a handover process of the mobile station UE from the cell #1 to the cell #11 and a handover process of the mobile station UE from the cell #11 to the cell #1. Therefore, it is not necessary to set up the length of the PDCP-SN used in communication within the cell #11/#1 for the mobile station UE before start of the handover process. As a result, it is possible to reduce the handover delay while avoiding an increase of a load on the C-Plane.

Features of the present embodiment described heretofore may be represented as follows.

A first feature of the present embodiment is a radio base station eNB #1 that manages a cell #1 in a mobile communication system in which the cell #1 (a first cell) using "Shorter-SN (a first sequence number)" as a PDCP-SN (a sequence number in a PDCP layer) and a cell #11 (a second cell) using "Longer-SN (a second sequence number) that has the length longer than the length of the "Shorter-SN" as the PDCP-SN are provided, the radio base station eNB #1 including a transmission unit 12 configured to notify a mobile station UE that the length of the PDCP-SN used in communication within the cell #11 (or the cell #1) is changed in a case where the mobile station UE performs a handover from the cell #1 to the cell #11 (or in a case where the mobile station UE performs a handover from the cell #11 to the cell #1).

A second feature of the present embodiment is a radio base station eNB #11 that manages a cell #11 in a mobile communication system in which a cell #1 using "Shorter-SN" as a PDCP-SN and the cell #11 using "Longer-SN" as the PDCP-SN are provided, the radio base station eNB #11 including a transmission unit 12 configured to notify a mobile station UE that the length of the PDCP-SN used in communication within the cell #1 (or the cell #11) is changed in a case where the mobile station UE performs a handover from the cell #11 to the cell #1 (or in a case where the mobile station UE performs a handover from the cell #1 to the cell #11).

A third feature of the present embodiment is a mobile station UE capable of conducting communication in a mobile communication system in which a cell #1 using "Shorter-SN" as a PDCP-SN and a cell #11 using "Longer-SN" as the PDCP-SN are provided, the mobile station UE including a setup unit 22 configured to change the length of the PDCP-SN used in communication within the cell #11 in response to an order from a radio base station eNB #1 (or a radio base station eNB #11), in a case where the mobile station UE performs a handover from the cell #1 to the cell #11.

A fourth feature of the present embodiment is a mobile station UE capable of conducting communication in a mobile communication system in which a cell #1 using "Shorter-SN" as a PDCP-SN and a cell #11 using "Longer-SN" as the PDCP-SN are provided, the mobile station UE including a setup unit 22 configured to change the length of the PDCP-SN used in communication within the cell #1 in response to an order from a radio base station eNB #11 (or a radio base station eNB #1), in a case where the mobile station UE performs a handover from the cell #11 to the cell #1.

Incidentally, the above-described operation of the mobile station UE and the radio base station eNB may be implemented by hardware, a software module which is executed by a processor, or a combination of the hardware and the software module.

The software module may be provided in a storage medium of an arbitrary form such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor to make it possible for the processor to read/write information from/into the storage medium. Furthermore, the storage medium may be integrated with the processor. Furthermore, the storage medium and the processor may be provided in an ASIC. The ASIC may be provided in the mobile station UE and the radio base station eNB. Furthermore, the storage medium and the processor may be provided in the mobile station UE and the radio base station eNB as a discrete component.

Heretofore, the present invention has been described in detail with reference to the above-described embodiment. It is apparent to those skilled in the art that the present invention is not limited to the embodiment described in the present specification. The present invention can be implemented as modified forms and changed forms without departing from the spirit and scope of the present invention defined by descriptions in claims. Therefore, descriptions in the present specification aim at exemplary description, and do not have any restrictive meaning on the present invention.

Incidentally, all contents in Japanese Patent Application No. 2012-055768 (filed on Mar. 13, 2012) are incorporated herein by reference.

INDUSTRIAL APPLICABILITY

As described heretofore, according to the present invention, it is possible to provide a radio base station and a mobile station capable of reducing a handover delay while avoiding an increase of a load on a C-Plane even in a case where a kind of the PDCP-SN used within a cell after the handover is changed.

REFERENCE SIGNS LIST

UE: Mobile station
eNB: Radio base station
11: Handover process unit
12: Transmission unit
21: Reception unit
22: Setup unit

The invention claimed is:
1. A radio base station that manages a first cell or a second cell in a mobile communication system, wherein:
   in the mobile communication system, the first cell using a first sequence number as a sequence number in a PDCP (Packet Data Convergence Protocol) layer and the second cell using a second sequence number that has a length longer than the length of the first sequence number as a sequence number in the PDCP layer are provided,
   the radio base station comprising a transmission unit configured to notify a mobile station that the length of the sequence number in the PDCP layer is changed in a case where the mobile station performs a handover from the first cell to the second cell or in a case where the mobile station performs a handover from the second cell to the first cell.
2. The radio base station according to claim 1, wherein the transmission unit is configured to conduct the notification using an information element "PDCP-Config."

3. A mobile station capable of conducting communication in a mobile communication system, wherein:

in the mobile communication system, a first cell using a first sequence number as a sequence number in a PDCP (Packet Data Convergence Protocol) layer and a second cell using a second sequence number that has the length longer than the length of the first sequence number as a sequence number in the PDCP layer are provided, the mobile station comprising a setup unit configured to change the length of the sequence number in the PDCP layer used in communication within the first cell or the second cell in response to an order from a radio base station that manages the first cell or the second cell, in a case where the mobile station performs a handover from the first cell to the second cell or in a case where the mobile station performs a handover from the second cell to the first cell.

4. The mobile station according to claim 3, wherein the order is configured to be given using an information element "PDCP-Config."

* * * * *